United States Patent [19]
Yamazaki

[11] Patent Number: 5,295,748
[45] Date of Patent: Mar. 22, 1994

[54] BALL BEARING FOR RECTILINEAR SLIDING

[75] Inventor: Mitsuru Yamazaki, Ojiya, Japan

[73] Assignee: Nippon Bearing Co., Ltd., Niigata, Japan

[21] Appl. No.: 961,409

[22] Filed: Oct. 15, 1992

[51] Int. Cl.$^5$ .................. F16C 29/06; F16C 43/06
[52] U.S. Cl. .................. 384/45; 29/898.03
[58] Field of Search .................. 384/43–45, 384/49; 29/898.03

[56] References Cited

U.S. PATENT DOCUMENTS

| | | | |
|---|---|---|---|
| 4,502,737 | 3/1985 | Osawa | 384/45 |
| 4,582,369 | 4/1986 | Itoh | 384/45 X |
| 4,743,124 | 5/1988 | Blaurock | 384/45 |
| 4,832,508 | 5/1989 | Teramachi | 384/45 |
| 4,880,317 | 11/1989 | Teramachi | 384/45 |
| 4,902,143 | 2/1990 | Morita | 384/44 X |
| 4,932,067 | 6/1990 | Pester et al. | 384/45 |
| 5,108,197 | 4/1992 | Morita | 384/45 |

FOREIGN PATENT DOCUMENTS

| | | |
|---|---|---|
| 57-38812 | 8/1982 | Japan . |
| 1-174625 | 12/1989 | Japan . |
| 3-10596 | 10/1992 | Japan . |
| 3-84126 | 10/1992 | Japan . |

Primary Examiner—Thomas R. Hannon
Attorney, Agent, or Firm—Sughrue, Mion, Zinn, Macpeak & Seas

[57] ABSTRACT

A ball bearing for rectilinear sliding, in which balls can be easily placed. The ball bearing includes a slide guide member which is slidably fitted onto a raceway track base and which has a slide member. A ball retaining material retains one side portion of the balls placed in load ball grooves of an inner surface of the slide member, and ball retaining flexible materials are provided on the inner surface of the wing portions of the slide member while another side portion of the balls is being retained. Thus, the balls placed in the load ball grooves are retained by the ball retaining material and the ball retaining flexible materials.

18 Claims, 5 Drawing Sheets

BALL BEARING FOR RECTILINEAR SLIDING

FIELD OF THE INVENTION

This invention relates to a ball bearing for rectilinear sliding, which is used for various machine tools or the like.

BACKGROUND OF THE INVENTION

Figure 1:
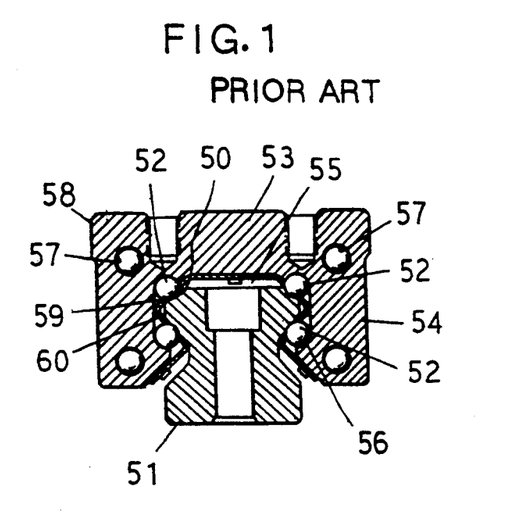
FIG. 1 is an explanatory view showing a conventional ball bearing for rectilinear sliding.

For example, as disclosed in Japanese Utility Model Unexamined Publication No. Hei 1-174625 and Japanese Patent Examined Publication No. 57-38812, a ball bearing for rectilinear sliding shown in FIG. 1 is conventional.

Figure 2:
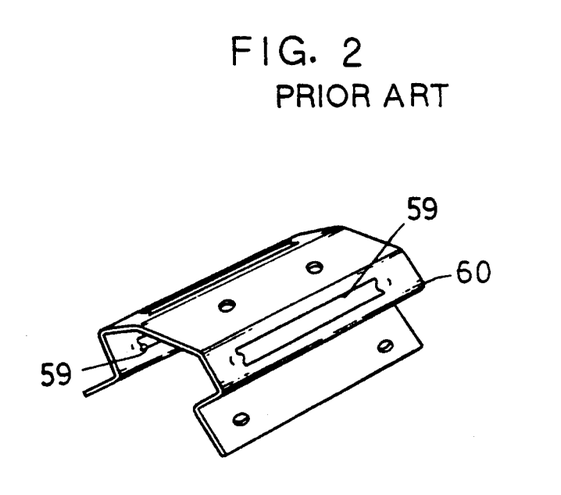
FIG. 2 is an explanatory view showing a conventional ball retainer.
Figure 3:
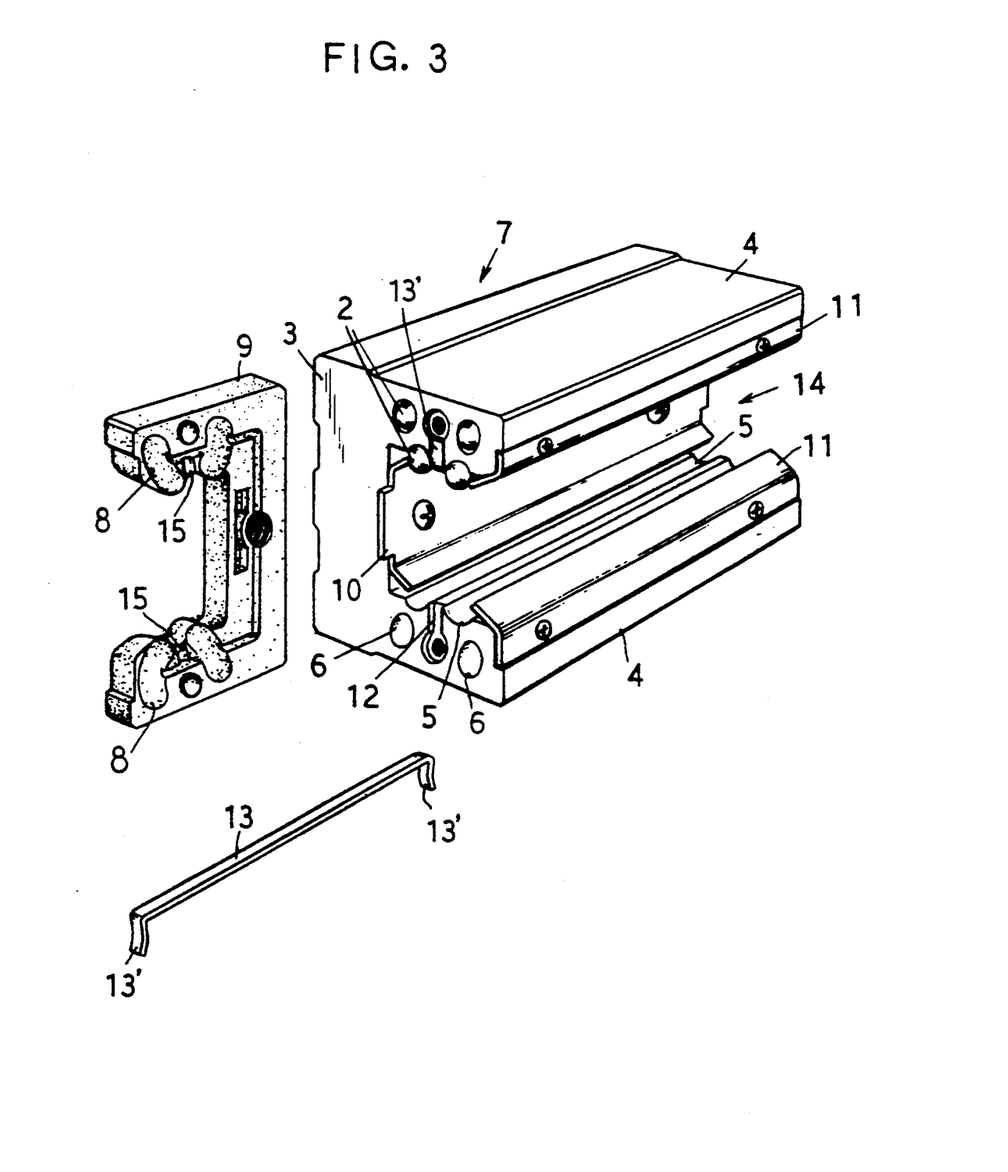
FIG. 3 is an exploded perspective view according to the first embodiment of the invention.
Figure 4:
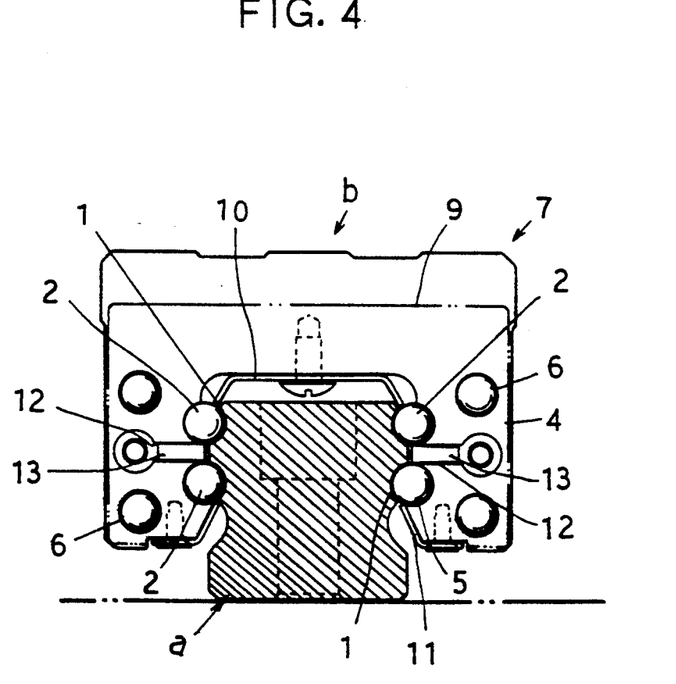
FIG. 4 is a frontal section view according to the first embodiment of the invention.
Figure 5:
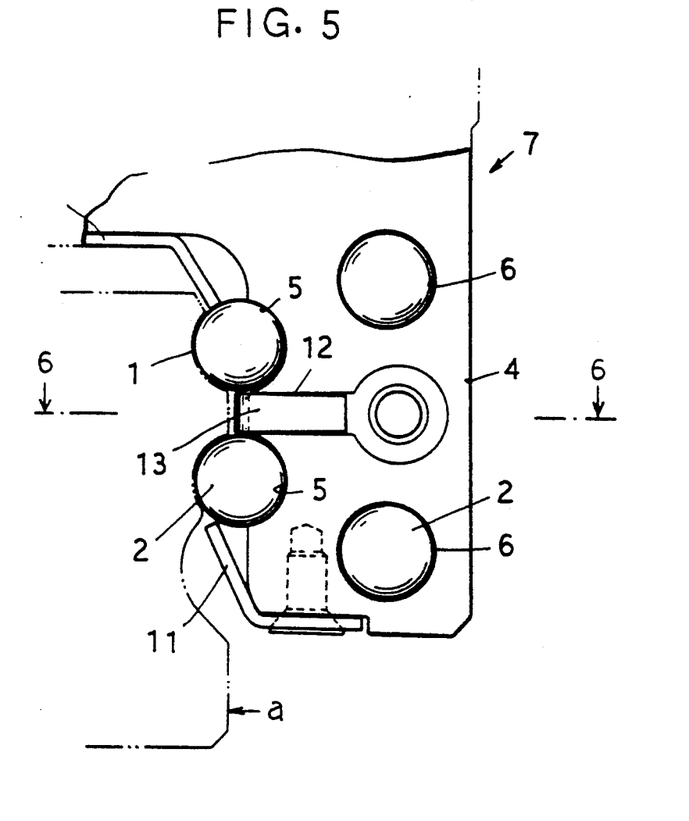
FIG. 5 is an enlargement view showing the main parts according to the first embodiment of the invention.

These conventional art ball bearings include a raceway track base 51 having ball rolling grooves 50 on the upper and lower portions of both sides thereof and a slide guide member, wherein wing portions 54 are formed at the both sides of a horizontal portion 53 extending downwardly in a perpendicular direction so as to form a concave portion 55 by the horizontal portion 53 and the wing portions 54. Load ball grooves 56 are provided at upper and lower portions on the inside surface of the respective wing portions 54, and no-load ball raceway tracks 57 are provided, corresponding to the load ball grooves 56, through the respective wing portions 54 so as to form a slide member 58. Plastic caps (not illustrated) having respective return grooves, corresponding to the load ball grooves 56 and the no-load ball raceway tracks 57, at right and left portions thereof are provided at the front and rear end surfaces of the slide member 58, so that four endless ball (hereinafter referred to as "ball endless") circulation passages are formed by the load ball grooves 56, the ball rolling grooves 50, no-load ball raceway tracks 57 and the return grooves. A ball retainer 60 having ball projecting windows 59 shown in FIG. 2 is fixed on the concave portion 55 formed by the horizontal portion 53 and both wing portions 54. Balls 52 are placed into the ball endless circulation passages, and the balls 52 are retained by the ball retainer 60. The slide guide member which comprises slide member 58 with balls 52 and ball retainer 60 is fitted onto the raceway track base 51, and as a result, the slide guide member is provided slidably relative to the raceway track base 51.

Since these conventional structures shown in FIG. 1 and 2 have the above-described structure, they have a disadvantage in that it is very difficult to place the balls 52 into the ball endless circulation passages.

To describe the placing work for balls 52 concretely, firstly, a cap having return grooves is fixed to one end surface of the slide member 58. Secondly, the ball retainer 60 shown in FIG. 2 is fixed on the inside surface of the slide member 58, the balls 52 are inserted, being supported by the slide member 58, one by one into the gaps, formed by the ball retainer 60 and the load ball groove 56, and into the no-load ball raceway tracks 57. After the predetermined number of balls 52 have been inserted, finally, another cap is fixed to another end surface of the slide member 58.

However, since the balls 52 are inserted into the gaps formed by the load ball groove 56 and the ball retainer 60 and the no-load ball raceway track 57, which are approximately equivalent in diameter with the balls 52, the balls 52 cannot be inserted adequately into the gaps and the no-load ball raceway tracks 57 and such placement is very difficult.

Moreover, since the predetermined number of the balls 52 must be placed into the ball endless circulation passages, when the cap is fixed to another end surface of the slide member 58 at last, grease is applied in the return grooves of the cap, and several balls 52 are attached to the grease so that the predetermined number of the balls are placed into the ball endless circulation passages. Subsequently, the cap is fixed to another end surface of the slide member 58 so that the balls 52 are prevented from fallingout. Even, under this condition, i.e., in the conventional manner, it is difficult to place balls into the ball endless circulation passages and to automate such a process.

SUMMARY OF THE INVENTION

An object of this invention is to provide a ball bearing for rectilinear sliding, into which balls can be placed easily.

Furthermore, another object of this invention is to automate the placement of the balls.

According to the present invention, a ball bearing for rectilinear sliding, comprises a raceway track base having ball rolling grooves on the both sides thereof; and a slide guide member, wherein wing portions are formed extending from both sides of a horizontal portion thereof downwardly in a perpendicular direction so as to form a slide member by the horizontal portion and both wing portions, load ball grooves are provided on the inside surface of the slide member, no-load ball raceway tracks are provided through the slide member, corresponding to the load ball grooves, and caps having return grooves corresponding to the load ball grooves and the no-load ball raceway track are provided at the front and rear end surfaces of the slide member so as to form ball endless circulation passages by the load ball grooves, the ball rolling grooves, the no-load ball raceway tracks and the return grooves, and a number of balls are placed into the ball endless circulation passages; the slide guide member is fitted onto the raceway track base, so that the slide guide member is provided slidably relative to the raceway track base. The ball bearing for rectilinear sliding further includes a ball retaining material for retaining one side portion of the balls placed in the load ball groove on the inside surface of the side member provided thereto and, ball retaining flexible materials made of a material having a flexibility are provided on the inside surface of both wing portions as freely loading/unloading thereto under the condition that another side portion of the balls is retained. Thus, balls placed in the load ball grooves are retained by the ball retaining members and the ball retaining flexible material. The ball retaining material and both caps are fixed to the slide member. For example, the outer side of the left wing portion is put on a table so that the slide member is placed sideways, and a number of balls are simultaneously inserted into the load ball groove on the inside surface of the left wing portion while shaking the slide member slightly, whereby the balls roll through the return grooves in the direction of the no-load ball raceway track, so that the placement of the balls into the left ball endless circulation passage is completed. After the placement of the balls has been completed, a ball retaining flexible material is fitted to the fixed position on the inside surface of the left wing portion.

Subsequently, the outer side of the right wing portion being put on a table, in the same manner, a number of balls are simultaneously inserted into the right bal endless circulation passage, the ball retaining flexible material is fitted to the fixed position on the inside surface of the right wing portion.

The slide guide member is assembled in the above-described manner and is used as a fitting onto the raceway track base.

As a result, the balls can be placed very easily.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

In the accompanying drawings, FIGS. 3 to 6 show the first embodiment and FIG. 7 shows the second embodiment;

DESCRIPTION OF THE PREFERRED EMBODIMENTS

The present invention will now be described with reference to FIGS. 3 to 7 which show an embodiment of the invention, in which four ball endless circulation passages are formed on upper and lower portions of the right and left sides of a ball bearing for rectilinear sliding.

The structure of the first embodiment will now be described below.

A ball bearing for rectilinear sliding, includes a raceway track base a having ball rolling grooves 1 on both sides thereof; and a slide guide member b, wherein wing portions 4 are formed extending from both sides of a horizontal portion 3 thereof downwardly in a perpendicular direction so as to form a slide member 7 by the horizontal portion 3 and the wing portions. Load ball grooves 5 are provided on the inside surface of the wing portion 4, and no-load ball raceway tracks 6 are provided through the wing portions 4, corresponding to the load ball grooves 5. Caps 9 having return grooves 8 corresponding to the load ball grooves 5 and the no-load ball raceway tracks 6 are provided at the front and rear end surfaces of the slide member 7 so as to form ball endless circulation passages by the load ball grooves 5, the ball rolling grooves 1, the no-load ball raceway tracks 6 and the return grooves 8. A plurality of balls 2 are placed into the ball endless circulation passages, and the slide guide member b is fitted onto the raceway track base a, so that the slide guide member b is provided slidably relative to the raceway track base a. The ball bearing for rectilinear sliding further includes respective two load ball grooves 5 provided, at upper and lower portions, on the inside surface of the wing portions 4, and respective two ball rolling grooves 1 are provided, at upper and lower portions, on the both sides of the raceway track base a. A ball retaining material 10 for retaining the upper side portions of the balls 2 placed in the upper load ball grooves 5 is provided on the inside surface of the horizontal portion 3 or the wing portions 4 of the slide member 7. Ball retaining materials 11 for retaining the lower side portions of the balls 2 placed in the lower load ball grooves 5 are provided on the inside surface of the wing portions 4 of the slide member 7, and ball retaining flexible materials 13 made of a material having a flexibility are provided on the inside surface of the wing portions 4 as freely loading and unloading thereto under the condition that the lower side portions of the upper balls 2 and the upper side portions of the lower balls 2 are retained. Thus, balls 2 placed in the load ball grooves 5 are retained by the ball retaining members 10, 11 and the ball retaining flexible materials 13.

Figure 6:
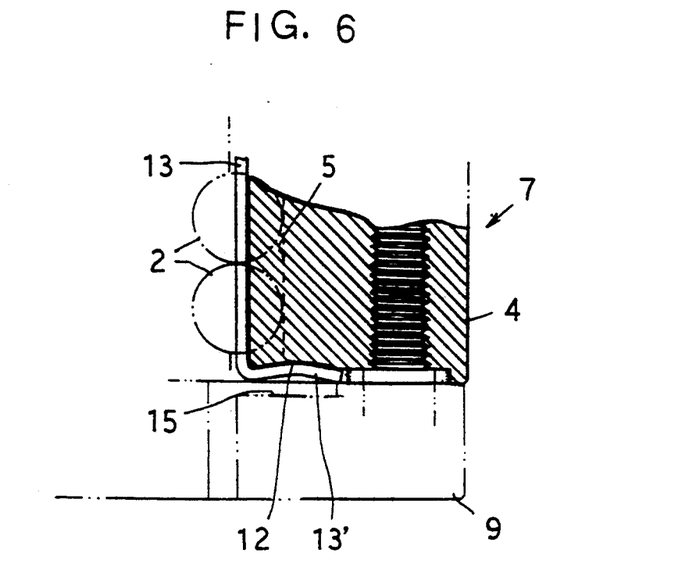
FIG. 6 is a sectional view taken on the indicative line VI—VI of FIG. 5.

Ball retaining flexible materials 13 may be made of a steel material or may be made of a hard plastic material. As shown in FIG. 6, a curved portion 13' curved in an inside direction is provided at its bent portion in order to prevent the ball retaining flexible material 13 from falling off an engagement concave portion 12.

Also, those drawings illustrate respective engagement concave portions 12 for engaging the end portions of the ball retaining flexible materials 13 provided, between the upper and lower load ball grooves 5, on the front and rear end surfaces of the slide member 7. However, the engagement concave portions 12 for engaging the end portions of the ball retaining flexible materials 13 may be provided, between the upper and lower ball endless circulation passages (between the upper and lower return grooves 8), on the outer surfaces of both caps 9. Namely, with the balls 2 in the upper and lower load ball grooves 5 retained by the ball retaining flexible material 13, it makes no difference wherever the engagement position of the end portions of the ball retaining flexible material 13 are positioned.

Further, curved portions, corresponding to the curved portions 13' of the ball retaining flexible material 13, are formed in the engagement concave portions 12.

A concave groove is for the ball retaining flexible material 13 to be loaded/unloaded easily, and a concave portion 14 are also provided.

Figure 7:
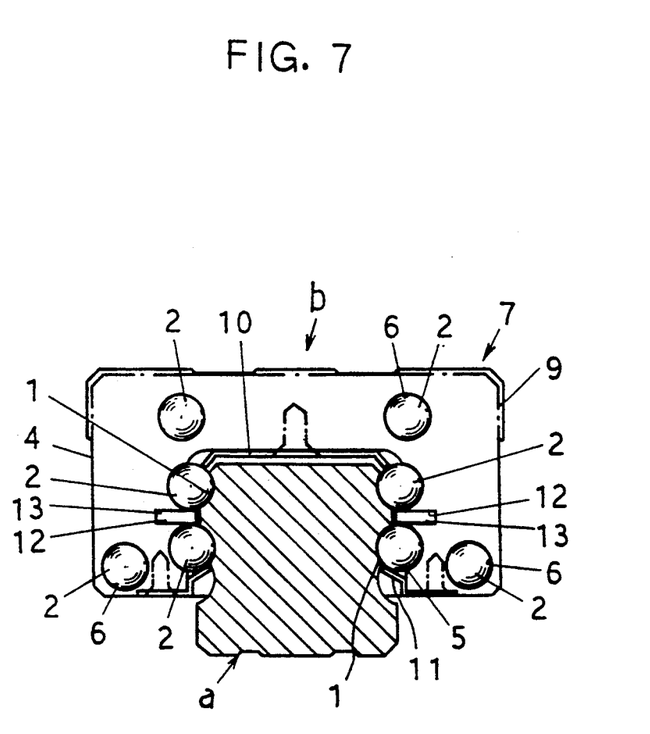
FIG. 7 is a frontal section view according to the second embodiment of the invention corresponding to FIG. 4.

A second embodiment of the invention includes the lower no-load ball raceway tracks 6 at both sides of the slide member 7 provided through the wing portion 4 an the upper no-load ball raceway tracks 6 at both sides of the slide member 7 provided through the horizontal portion 3. All of the other structures an the associated effects are the same as those of the first embodiment.

As described above, with such a structure according to the present invention, balls 2 are placed easily into ball endless circulation passages since the balls 2 can be inserted into wide gaps between right and left wing portions as opposed to gaps (i.e., in conventional systems, gaps being formed by a ball retainer 60 and a load ball groove 56, and no-load ball raceway tracks 57), which are approximately equal wit the ball in diameter as prior art. Furthermore, according to the present invention, ball retaining flexible materials 13 are loaded after the balls have been placed. Accordingly, since the present invention, unlike the prior art, does not have the side of the load ball grooves 56 blocked by the ball retainer 60, even if the balls 2 are not properly inserted into the load ball grooves 5 when the balls are inserted, the balls 2 can spontaneously be placed into the load ball grooves 5 by manually shaking slide member 7 slightly.

In the conventional structure in which the side of the load ball grooves 56 are blocked up by the ball retainer 60 and an opening portion is provided at only the end portion of the load ball grooves 56, of course, the balls 52 are placed only from the opening portions into the load ball grooves 56, so that the balls 52 may scatter or fall out by mistake. In this respect, as above-described, according to the present invention, the placement of the balls 2 into the ball endless circulation passage (the load ball grooves 5 and no-load ball raceway tracks 6) is completed by the easy work that a plurality of balls 2 being put on a person's palm and simultaneously fall into the inside surface of the wing portion 4 and then the slide member 7 is shaken slightly.

Moreover, according to the present invention, the placement of the balls 2 is done after both caps 9 have been fixed to the front and rear end surfaces of the slide member 7, without a process in which only one cap 9 is fixed to the slide member 7 and another cap 9 is fixed to the slide member 7 subsequently. As a result, as described in the "Background of the invention", it is not necessary to apply a grease to the return grooves 8 of the cap 9. Accordingly, ti is possible to automate ball placing work.

Also, according to the present invention, an epoch-making effect, i.e., changing very troublesome work into very easy work, is displayed when the balls 2 are placed into the ball bearing for rectilinear sliding practically. Additionally, it is possible to provide high-precision and low-priced ball bearings.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A ball bearing for rectilinear sliding, comprising:
   a raceway track base having first and second sides and having ball rolling grooves on said first and second sides; and
   a slide guide member slidably fitted on said raceway track base and comprising a slide member having a horizontal portion and first and second wing portions extending perpendicularly from respective first and second sides of said horizontal portion,
   said slide member further including load ball grooves provided on an inner surface of said slide member, no-load ball raceway tracks provided in said slide member, corresponding to said load ball grooves, and first and second caps having return grooves corresponding to said load ball grooves and said no-load ball raceway tracks, said first and second caps being provided at respective first and second ends of said slide member such that endless ball circulation passages are formed by said load ball grooves, said ball rolling grooves, said no-load ball raceway tracks and said return grooves,
   wherein a plurality of balls are slidably positioned in said endless ball circulation passages,
   said ball bearing further comprising a first material, provided on said inner surface of said slide member, for retaining a first side portion of said balls placed in said load ball grooves on the inner surface of said slide guide member, and
   a second material comprising a flexible material provided on the inner surface of said wing portions such that a second side portion of said balls are retained, whereby said balls placed in said load ball grooves are retained by said first material and said second material;
   said ball bearing for rectilinear sliding further comprising curved engagement portions for engaging bent portions of said second material provided on the first and second end surfaces of one of said slide member and said caps.

2. A ball bearing according to claim 1, wherein said second material comprises one of steel and plastic.

3. A ball bearing for rectilinear sliding, comprising:
   a raceway track base having first and second sides and having ball rolling grooves on said first and second sides; and
   a slide guide member slidably fitted on said raceway track base and comprising a slide member having a horizontal portion and first and second wing portions extending perpendicularly from respective first and second sides of said horizontal portion,
   said slide member further including load ball grooves provided on an inner surface of said slide member, no-load ball raceway tracks provided in said slide member, corresponding to said load ball grooves, and first and second caps having return grooves corresponding to said load ball grooves and said no-load ball raceway tracks, said first and second caps being provided at respective first and second ends of said slide member such that endless ball circulation passages are formed by said load ball grooves, said ball rolling grooves, said no-load ball raceway tracks and said return grooves,
   wherein a plurality of balls are slidably positioned in said endless ball circulation passages, and
   wherein respective first load ball grooves and second load ball grooves are provided at a first portion and at a second portion of an inner surface of the wing portions of said slide member, and respective first ball rolling grooves and second ball rolling grooves are provided, at said first and second portions, on the first and second sides of said raceway track base,
   said ball bearing further comprising a first material, provided on one of the inner surface of said horizontal portion and said wing portions of said slide member, for retaining first side portions of said balls positioned in said first load ball grooves,
   a second material, provided on the inner surface of said wing portions of said slide member, for retaining second side portions of said balls positioned in the second load ball grooves, and
   a third material comprising a flexible material provided on the inner surface of said wing portions so as to retain second side portions of said balls positioned in said first load ball grooves and first side portions of said balls positioned in said second load ball grooves are retained by said first and third materials, and said balls placed in said second load ball grooves are retained by said second and third materials;
   said ball bearing further comprising curved engagement portions for engaging bent portions of said third material provided on the first and second end surfaces of one of said slide member and said caps.

4. A ball bearing according to claim 3 wherein said third material comprises one of steel and plastic.

5. A ball bearing for rectilinear sliding, comprising:
a raceway track base having first and second sides and having ball rolling grooves on said first and second sides; and
a slide guide member slidably fitted on said raceway track base and comprising a slide member having a horizontal portion and first and second wing portions extending perpendicularly from respective first and second sides of said horizontal portion,
said slide member further including load ball grooves provided on an inner surface of said slide member, no-load ball raceway tracks provided in said first and second wing portions, corresponding to said load ball grooves, and first and second caps having return grooves corresponding to said load ball grooves and said no-load ball raceway tracks provided at first and second ends of said slide member such that endless ball circulation passages are formed by said load ball grooves, said ball rolling grooves, said no-load ball raceway tracks an said return grooves, wherein a plurality of balls are slidably positioned in said endless ball circulation passages,
wherein respective first load ball grooves and second load ball grooves are provided, at first and second portions, on the inner surface of the wing portions of said slide member, and respective first and second ball rolling grooves are provided, at first and second portions, on the first and second sides of said raceway track base,
said ball bearing further comprising a first material, provided on one of the inner surface of said horizontal portion and said wing portions of said slide member, for retaining first side portions of said balls positioned in said first load ball grooves,
a second material, provided on the inner surface of said wing portions of said slide member, for retaining second side portions of said balls positioned in the second load ball grooves, and
a third material comprising a flexible material provided on the inner surface of said wing portions so as to retain second side portions of said balls positioned in said first load ball grooves and first side portions of said balls positioned in said second load ball grooves, whereby said balls placed in said first load ball grooves are retained by said first and third materials, and said balls placed in said second load ball grooves are retained by said second and third material;
said ball bearing further comprising curved engagement portions for engaging bent portions of said third material provided on the first and second end surfaces of one of said slide member and said caps.

6. A ball bearing according to claim 5, wherein said third material comprises one of steel and plastic.

7. A ball bearing for rectilinear sliding, comprising:
a raceway track base having first and second sides and having ball rolling grooves on said first and second sides; and
a slide guide member slidably fitted onto said raceway track base and comprising a slide member having a horizontal portion and first and second wing portions extending perpendicularly from respective first and second sides of said horizontal portion, said slide member further including load ball grooves provided on an inner surface of said slide member, no-load ball raceway tracks provided in said horizontal portion and said wing portions, corresponding to said load ball grooves, and first and second caps having return grooves corresponding to said load ball grooves and said no-load ball raceway tracks, said first and second caps being provided at respective first and second ends of said slide member such that endless ball circulation passages are formed by said load ball grooves, said ball rolling grooves, said no-load ball raceway tracks and said return grooves, wherein a plurality of balls are slidably positioned in said endless ball circulation passages,
wherein respective first load ball grooves and second load ball grooves are provided, at first and second portions, on the inner surface of the wing portions of said slide member, and respective first ball rolling grooves and second ball rolling grooves are provided, at first and second portions, on the first and second sides of said raceway track base,
said ball bearing further comprising a first material, provided on one of the inner surface of said horizontal portion and said wing portions of said slide member, for retaining first side portions of said balls positioned in said first load ball grooves,
a second material, provided on the inner surface of said wing portions of said slide member, for retaining second side portions of said balls positioned in the second load ball grooves, and
a third material comprising a flexible material provided on the inner surface of said wing portions, for retaining second side portions of said balls positioned in said first load ball grooves and the first side portions of said balls positioned in said second load ball grooves, whereby said balls placed in said first load ball grooves are retained by said first and third materials, and said balls placed in said second load ball grooves are retained by said second and third material;
said ball bearing further comprising curved engagement portions for engaging said portions of said third material provided on the first and second end surfaces of one of said slide member and said caps.

8. A ball bearing according to claim 7, wherein said third material comprises one of steel and plastic.

9. A ball bearing for rectilinear sliding, comprising:
a raceway track base having first and second sides and having ball rolling grooves on said first and second sides; and
a slide guide member slidably fitted on said raceway track base and comprising a slide member having a horizontal portion and first and second wing portions extending perpendicularly from respective first and second sides of said horizontal portion,
said slide member further including load ball grooves provided on an inner surface of said slide member, no-load ball raceway tracks provided in said slide member, corresponding to said load ball grooves, and first and second caps having return grooves corresponding to said load ball grooves and said no-load ball raceway tracks, said first and second caps being provided at respective first and second ends of said slide member such that endless ball circulation passages are formed by said load ball grooves, said ball rolling grooves, said no-load ball raceway tracks and said return grooves, wherein a plurality of balls are slidably positioned in said endless ball circulation passages, said ball bearing further comprising a first material, provided on said inner surface of said slide member, for retaining a first side portion of said balls placed in said load ball grooves on the inner surface of said slide guide member, and a second comprising a flexible material provided on the inner surface of said wing portions such that a second side portion of said balls are retained, whereby said balls placed in said load ball grooves are retained by said first material and said second material;

wherein bent portions of said second material comprise portions having a curvature, said ball bearing further comprising means for engaging said portions having said curvature such that the second material is prevented from disengaging said wing portions.

10. A ball bearing for rectilinear sliding, comprising:

a raceway track base having first and second sides and having ball rolling grooves on said first and second sides; and a slide guide member slidably fitted on said raceway track base and comprising a slide member having a horizontal portion and first and second wing portions extending perpendicularly from respective first and second sides of said horizontal portion, said slide member further including load ball grooves provided on an inner surface of said slide member, no-load ball raceway tracks provided in said slide member, corresponding to said load ball grooves, and first and second caps having return grooves corresponding to said load ball grooves and said no-load ball raceway tracks, said first and second caps being provided at respective first and second ends of said slide member such that endless ball circulation passages are formed by said load ball grooves, said ball rolling grooves, said no-load ball raceway tracks and said return grooves, wherein a plurality of balls are slidably positioned in said endless ball circulation passages, said ball bearing further comprising a first material, provided on said inner surface of said slide member, for retaining a first side portion of said balls placed in said load ball grooves on the inner surface of said slide guide member, and a second material comprising a flexible material provided on the inner surface of said wing portions such that a second side portion of said balls are retained, whereby said balls placed in said load ball grooves are retained by said first material and said second material;

wherein said cap s include a concave groove for enabling the second material to be loaded and unloaded.

11. A ball bearing for rectilinear sliding, comprising:

a raceway track base having first and second sides and having ball rolling grooves on said first and second sides; and a slide guide member slidably fitted on said raceway track base and comprising a slide member having a horizontal portion and first and second wing portions extending perpendicularly from respective first and second sides of said horizontal portion, said slide member further including load ball grooves provided on an inner surface of said slide member, no-load ball raceway tracks provided in said slide member, corresponding to said load ball grooves, and first and second caps having return grooves corresponding to said load ball grooves and said no-load ball raceway tracks, said first and second caps being provided at respective first and second ends of said slide member such that endless ball circulation passages are formed by said load ball grooves, said ball rolling grooves, said no-load ball raceway tracks and said return grooves, wherein a plurality of balls are slidably positioned in said endless ball circulation passages, and wherein respective first load ball grooves and second load ball grooves are provided at a first portion and at a second portion of an inner surface of the wing portions of said slide member, and respective first ball rolling grooves and second ball rolling grooves are provided, at said first and second portions, on the first and second sides of said raceway track base, said ball bearing further comprising a first material, provided on one of the inner surface of said horizontal portion and said wing portions of said slide member for retaining first side portions of said balls positioned in said first load ball grooves, a second material, provided on the inner surface of said wing portions of said slide member, for retaining second side portions of said balls positioned in the second load ball grooves, and a third material comprising a flexible material provided on the inner surface of said wing portions so as to retaining second side portions of said balls positioned in said first load ball grooves and the first side portions of said balls positioned in said second load ball grooves, whereby said balls placed in said first load ball grooves are retained by said first and third materials, and said balls placed in said second load ball grooves are retained by said second and third material;

wherein bent portions of said third material comprise portions having a curvature, said ball bearing further comprising means for engaging said portions having said curvature such that the third material is prevented from disengaging said wing portions.

12. A ball bearing for rectilinear sliding, comprising:

a raceway track base having first and second sides and having ball rolling grooves on said first and second sides; and a slide guide member slidably fitted on said raceway track base and comprising a slide member having a horizontal portion and first and second wing portions extending perpendicularly from respective first and second sides of said horizontal portion, said slide member further including load ball grooves provided on an inner surface of said slide member, no-load ball raceway tracks provided in said slide member, corresponding to said load ball grooves, and first and second caps having return grooves corresponding to said load ball grooves and said no-load ball raceway tracks, said first and second caps being provided at respective first and second ends of said slide member such that endless ball circulation passages are formed by said load ball grooves, said ball rolling grooves, said no-load ball raceway tracks and said return grooves, wherein a plurality of balls are slidably positioned in said endless ball circulation passages, and wherein respective first load ball grooves and second load ball grooves are provided at a first portion and at a second portion of an inner surface of the wing portions of said slide member, and respective first ball rolling grooves and second ball rolling grooves are provided, at said first and second portions, on the first and second sides of said raceway track base, said ball bearing further comprising a first material, provided on one of the inner surface of said horizontal portion and said wing portions of said slide member for retaining first side portions of said balls positioned in said first load ball grooves, a second material, provided on the inner surface of said wing portions of said slide member, for retaining second side portions of said balls positioned in the second load ball grooves, and a third material comprising a flexible material provided on the inner surface of said wing portions so as to retaining second side portions of said balls positioned in said first load ball grooves and the first side portions of said balls positioned in said second load ball grooves, whereby said balls placed in said first load ball grooves are retained by said first and third materials, and said balls placed in said second load ball grooves are retained by said second and third material;

wherein said caps include a concave groove for enabling the third material to be loaded and unloaded.

13. A ball bearing for rectilinear sliding, comprising:
a raceway track base having first and second sides and having ball rolling grooves on said first and second sides; and a slide guide member slidably fitted on said raceway track base and comprising a slide member having a horizontal portion and first and second wing portions extending perpendicularly from respective first and second sides of said horizontal portion, said slide member further including load ball grooves provided on an inner surface of said slide member, no-load ball raceway tracks provided in said first and second wing portions, corresponding to said load ball grooves, and first and second caps having return grooves corresponding to said load ball grooves and said no-load ball raceway tracks provided at first and second ends of said slide member such that endless ball circulation passages are formed by said load ball grooves, said ball rolling grooves, said no-load ball raceway tracks and said return grooves, wherein a plurality of balls are slidably positioned in said endless ball circulation passages, wherein respective first load ball grooves and second load ball grooves are provided, at a first and second portions, on the inner surface of the wing portions of said slide member, and respective first and second ball rolling grooves are provided, at first and second portions, on the first and second sides of said raceway track base, said ball bearing further comprising a first material, provided on one of the inner surface of said horizontal portion and said wing portions of said slide member, for retaining first side portions of said balls positioned in said first load ball grooves, a second material, provided on the inner surface of said wing portions of said slide member, for retaining second side portions of said balls positioned in the second load ball grooves, and a third material comprising a flexible material provided on the inner surface of said wing portions so as to retain second side portions of said balls positioned in said first load ball grooves and the first side portions of said balls positioned in said second load ball grooves, whereby said balls placed in said first load ball grooves are retained by said first and third materials, and said balls placed in said second load ball grooves are retained by said second and third material;

wherein bent portions of said third material comprise portions having a curvature, said ball bearing further comprising means for engaging said portions having said curvature such that the third material is prevented from disengaging said wing portions.

14. A ball bearing for rectilinear sliding, comprising:
a raceway track base having first and second sides and having ball rolling grooves on said first and second sides; and a slide guide member slidably fitted on said raceway track base and comprising a slide member having a horizontal portion and first and second wing portions extending perpendicularly from respective first and second sides of said horizontal portion, said slide member further including load ball grooves provided on an inner surface of said slide member, no-load ball raceway tracks provided in said first and second wing portions, corresponding to said load ball grooves, and first and second caps having return grooves corresponding to said load ball grooves and said no-load ball raceway tracks provided at first and second ends of said slide member such that endless ball circulation passages are formed by said load ball grooves, said ball rolling grooves, said no-load ball raceway tracks and said return grooves, wherein a plurality of balls are slidably positioned in said endless ball circulation passages, wherein respective first load ball grooves and second load ball grooves are provided, at a first and second portions, on the inner surface of the wing portions of said slide member, and respective first and second ball rolling grooves are provided, at first and second portions, on the first and second sides of said raceway track base, said ball bearing further comprising a first material, provided on one of the inner surface of said horizontal portion and said wing portions of said slide member, for retaining first side portions of said balls positioned in said first load ball grooves, a second material, provided on the inner surface of said wing portions of said slide member, for retaining second side portions of said balls positioned in the second load ball grooves, and a third material comprising a flexible material provided on the inner surface of said wing portions so as to retain second side portions of said balls positioned in said first load ball grooves and the first side portions of said balls positioned in said second load ball grooves, whereby said balls placed in said first load ball grooves are retained by said first and third materials, and said balls placed in said second load ball grooves are retained by said second and third material;

wherein said caps include a concave groove for enabling the third material to be loaded and unloaded.

15. A ball bearing for rectilinear sliding, comprising:
a raceway track base having first and second sides and having ball rolling grooves on said first and second sides; and a slide guide member being slidably fitted onto said raceway track base and comprising a slide member having a horizontal portion and first and second wing portions extending perpendicularly from respective first and second sides of said horizontal portion, said slide member further including load ball grooves provided on an inner surface of said slide member, no-load ball raceway tracks provided in said horizontal portions and said wing portions, corresponding to said load ball grooves, and first and second caps having return grooves corresponding to said load ball grooves and said no-load ball raceway tracks, said first and second caps being provided at respective first and second ends of said slide member such that endless ball circulation passages are formed by said load ball grooves, said ball rolling grooves, said no-load ball raceway tracks and said return grooves, wherein a plurality of balls are slidably positioned in said endless ball circulation passages, wherein respective first load ball grooves and second load ball grooves are provided, at first and second portions, on the inner surface of the wing portions of said slide member, and respective first ball rolling grooves are and second ball rolling grooves are provided, at first and second portions, on the first and second sides of said raceway track base, said ball bearing further comprising a first material, provided on one of the inner surface of said horizontal portion and said wing portions of said slide member, for retaining first side portions of said balls positioned in said first load ball grooves, a second material, provided on the inner surface of said wing portions of said slide member, for retaining second side portions of said balls positioned in the second load ball grooves, and a third material comprising a flexible material provided on the inner surface of said wing portions, for retaining second side portions of said balls positioned in said first load ball grooves and the first side portions of said balls placed in said second load ball grooves, whereby said balls placed in said first load ball grooves are retained by said first and third materials, and said balls placed in said second load ball grooves are retained by said second and third material;

wherein bent portions of said third material comprise portions having a curvature, said ball bearing further comprising means for engaging said portions having said curvature such that the third material is prevented from disengaging said wing portions.

16. A ball bearing for rectilinear sliding, comprising:

a raceway track base having first and second sides and having ball rolling grooves on said first and second sides; and a slide guide member being slidably fitted on said raceway track base and comprising a slide member having a horizontal portion and first and second wing portions extending perpendicularly from respective first and second sides of said horizontal portion, said slide member further including load ball grooves provided on an inner surface of said slide member, no-load ball raceway tracks provided in said horizontal portion and said wing portion, corresponding to said load ball grooves, and first and second caps having return grooves corresponding to said load ball grooves and said no-load ball raceway tracks, said first and second caps being provided at respective first and second ends of said slide member such that endless ball circulation passages are formed by said load ball grooves, said ball rolling grooves, said no-load ball raceway tracks and said return grooves, wherein a plurality of balls are slidably positioned in said endless ball circulation passages, wherein respective first load ball grooves and second load ball grooves are provided, at a first and second portions, on the inner surface of the wing portions of said slide member, and respective first and second ball rolling grooves and second ball rolling grooves are provided, at first and second portions, on the first and second sides of said raceway track base, said ball bearing further comprising a first material, provided on one of the inner surface of said horizontal portion and said wing portions of said slide member, for retaining first side portions of said balls positioned in said first load ball grooves, a second material, provided on the inner surface of said wing portions of said slide member, for retaining second side portions of said balls positioned in the second load ball grooves, and a third material comprising a flexible material provided on the inner surface of said wing portions, for retaining second side portions of said balls positioned in said first load ball grooves and the first side portions of said balls placed in said second load ball grooves, whereby said balls placed in said first load ball grooves are retained by said first and third materials, and said balls placed in said second load ball grooves are retained by said second and third materials;

wherein said caps include a concave groove for enabling the third material to be loaded and unloaded.

17. A method of assembling a ball bearing for rectilinear sliding, said ball bearing comprising:

a raceway track base having first and second sides and having ball rolling grooves on said first and second sides; and a slide guide member slidably fitted on said raceway track base and comprising a slide member having a horizontal portion and first and second wing portions extending perpendicularly from respective first and second sides of said horizontal portion, said slide member further including load ball grooves provided on an inner surface of said slide member, no-load ball raceway tracks provided in said slide member, corresponding to said load ball grooves, and first and second caps having return grooves corresponding to said load ball grooves and said no-load ball raceway tracks;

said method comprising the steps of:

a) fixing said first and second caps at respective first and second ends of said slide member such that endless ball circulation passages are formed by said load ball grooves, said ball rolling grooves, said no-load ball raceway tracks and said return grooves; and then b) slidably placing a plurality of balls in said endless ball circulation passages; followed by c) fitting a first material, on one of the inner surface of said horizontal portion and said wing portions of said slide member, for retaining first side portions of said balls positioned in said load ball grooves; and d) fitting a second material, comprising a flexible material, on the inner surface of said wing portions so as to retain second side portions of said balls positioned in said load ball grooves, whereby said balls placed in said load ball grooves are retained by said first and second materials.

18. A method of assembling a ball bearing for rectilinear sliding, said ball bearing comprising:
a raceway track base having first and second sides and having ball rolling grooves on said first and second sides; and
a slide guide member slidably fitted on said raceway track base and comprising a slide member having a horizontal portion and first and second wing portions extending perpendicularly from respective first and second sides of said horizontal portion,
said slide member further including load ball grooves provided on an inner surface of said slide member, no-load ball raceway tracks provided in said slide member, corresponding to said load ball grooves, and first and second caps having return grooves corresponding to said load ball grooves and said no-load ball raceway tracks;
a) fixing said first and second caps at respective first and second ends of said slide member such that endless ball circulation passages are formed by said load ball grooves, said ball rolling grooves, said no-load ball raceway tracks and said return grooves; and then
b) slidably positioning a plurality of balls in said endless ball circulation passages, wherein respective first load ball grooves and second load ball grooves are provided at a first portion and at a second portion of an inner surface of the wing portions of said slide member, and respective first ball rolling grooves and second ball rolling grooves are provided, at said first and second portions, on the first and second sides of said raceway track base; followed by
c) fitting a first material, on one of the inner surface of said horizontal portion and said wing portions of said slide member, for retaining first side portions of said balls positioned in said first load ball grooves;
d) fitting a second material, on the inner surface of said wing portions of said slide member, for retaining second side portion of said balls positioned in the second load ball grooves; and
e) fitting a third material, comprising a flexible material, on the inner surface of said wing portions so as to retain second side portions of said balls positioned in said first load ball grooves and first side portions of said balls positioned in said second load ball grooves, whereby said balls placed in said first load ball grooves are retained by said first and third materials, and said balls placed in said second load ball grooves are retained by said second and third materials.

* * * * *

UNITED STATES PATENT AND TRADEMARK OFFICE
CERTIFICATE OF CORRECTION

PATENT NO. : 5,295,748  Page 1 of 2
DATED : March 22, 1994
INVENTOR(S) : Mitsuru Yamazaki It is certified that error appears in the above-identified patent and that said Letters Patent is hereby corrected as shown below:

```
Column 2, line 45, delete "side" and insert --slide--;
Column 2, line 67, delete "bal" and insert --ball--.

Column 3, line 52, after "portions" insert --4--.
Column 4, line 44, after "groove" delete "is" and insert
--15--;
Column 4, line 49, delete "an" and insert --and--;
Column 4, line 52, delete "an" and insert --and--.
Column 7, line 53, delete "material" and insert --materials--.
Column 8, line 41, delete "material" and insert --materials--.
Column 9, line 8, after "second" insert --material--;
Column 9, line 54, delete "cap s" and insert --caps--.
Column 10, line 31, delete "retaining" and insert --retain--;
Column 10, line 38, delete "material" and insert
--materials--.
Column 11, line 18, delete "retaining" and insert --retain--;
Column 11, line 25, delete "material" and insert
--materials--.
Column 12, line 8, delete "material" and insert --materials--;
Column 12, line 62, delete "material" and insert
--materials--.
Column 13, line 9, delete "portions" and insert --portion--;
Column 13, line 46, delete "material" and insert
--materials--;
Column 13, lines 64 and 65, delete "portion" and insert
--portions--.
Column 14, line 9, delete "a".
```

UNITED STATES PATENT AND TRADEMARK OFFICE
CERTIFICATE OF CORRECTION

PATENT NO.  : 5,295,748
DATED       : March 22, 1994
INVENTOR(S) : Mitsuru Yamazaki It is certified that error appears in the above-indentified patent and that said Letters Patent is hereby corrected as shown below:

Column 15, between lines 24 and 25, insert --said method comprising the steps of:--.

Signed and Sealed this

Twenty-seventh Day of September, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,295,748
DATED : March 22, 1994
INVENTOR(S) : Mitsuru Yamazaki

It is certified that error appears in the above-indentified patent and that said Letters Patent is hereby corrected as shown below:

Column 3, line 30, delete "VI-VI" and insert --6-6--.

Signed and Sealed this

Twenty-second Day of November, 1994

Attest:

BRUCE LEHMAN

Attesting Officer

Commissioner of Patents and Trademarks